Dec. 6, 1938.   L. S. HOBBS   2,138,969
OIL PRESSURE RELIEF VALVE FOR INTERNAL COMBUSTION ENGINES
Filed May 26, 1936   2 Sheets-Sheet 2
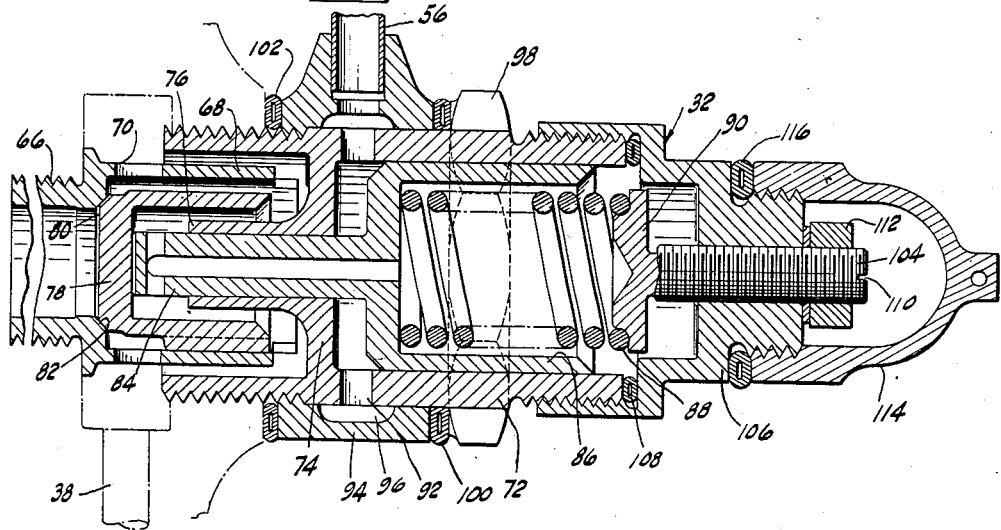
INVENTOR.
Leonard S. Hobbs
BY Harris G. Luther
ATTORNEY

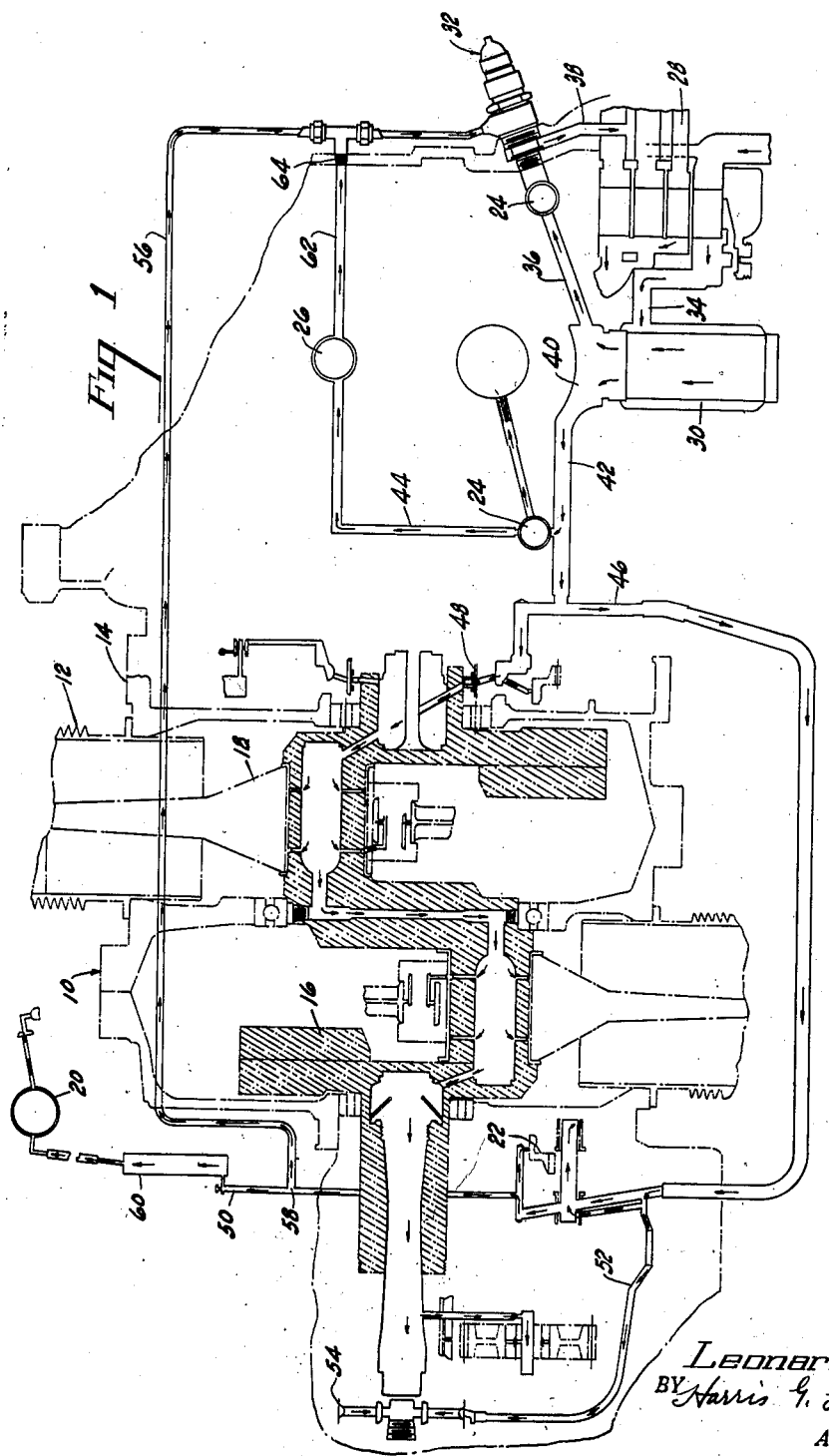

Patented Dec. 6, 1938

2,138,969

UNITED STATES PATENT OFFICE 2,138,969

OIL PRESSURE RELIEF VALVE FOR INTERNAL COMBUSTION ENGINES

Leonard S. Hobbs, West Hartford, Conn., assignor to United Aircraft Corporation, East Hartford, Conn., a corporation of Delaware Application May 26, 1936, Serial No. 81,849

16 Claims. (Cl. 184—6)

This invention relates to improvements in internal combustion engines, and has particular reference to improvements in the lubrication system of such an engine.

For some time it has been recognized in the industry that a considerable portion of the wear on internal combustion engines may occur during the initial or warming up period of the engine before the lubricating oil has become sufficiently heated and fluid to flow readily to all of the moving parts of the engine. Little, however, has been devised to overcome this condition except the requirement of protracted warming up periods at slow engine speeds and light load, and the delay of power operation until the oil has reached a prescribed temperature. While the operation of the engine at low speed and light loads greatly minimizes the friction on the moving parts, it is still probable that a considerable amount of wear, and even the initiation of a dangerous friction condition which may ultimately result in freezing or binding of the parts, may occur during the warming up period or the beginning of the power operation.

An object of this invention resides in the provision of means for supplying an adequate amount of lubricant to all of the moving parts of the engine, even when the lubricant is cold and viscuous and the engine oil pressure pump is operating at a relatively slow speed.

A further object resides in the provision of means which will automatically restore the lubricant circulation to normal conditions as the lubricant warms up and becomes fluid.

Other objects and advantages will be more particularly pointed out hereinafter, or will become apparent as the description proceeds.

In the accompanying drawings in which like reference numerals are used to designate similar parts throughout, there is illustrated a suitable mechanical embodiment of the idea of the invention, the drawings, however, are for the purpose of illustration only and are not to be taken as limiting the invention, the scope of which is to be measured entirely by the scope of the appended claims.

In the drawings, Fig. 1 is a partly schematic illustration of the lubricating system and certain of the essential parts of an internal combustion engine showing the device of the invention applied thereto.

Fig. 2 is a longitudinal sectional view of an oil pressure relief valve constructed according to the idea of the invention.

Referring to the drawings in detail, the numeral 10 generally indicates an internal combustion engine of the radial air-cooled type commonly employed for the propulsion of airplanes. It is to be understood, however, that the application of the device of the invention is in no way limited to this particular type of engine, but may be applied to any engine having a forced feed or pressure lubrication system. The engine is provided with a plurality of cylinders 12 radially arranged about the crankcase 14, which cylinders contain reciprocable pistons operatively connected with the rotatable crankshaft 16 by means of the connecting rods 18. The engine is also provided with suitable valves and valve operating mechanisms as indicated at 20 driven by a suitable cam 22. The crankshaft 16 drives suitable accessories such as magnetos and a supercharger, the shafts of which are schematically indicated at 24 and 26 respectively.

The engine illustrated is of the pressure lubricated type and is provided with an elaborate system of lubricating oil conduits schematically illustrated in Fig. 1 of the accompanying drawings, the main portions of which will be referred to hereinafter. The engine drives an oil pressure pump 28 which is designed to have a capacity greater than the normal lubrication requirements of the engine. Adjacent to this pump are a strainer 30 and an oil pressure relief valve generally indicated at 32, the pump being connected with the strainer by a pump outlet conduit 34, the strainer being connected to the valve through an oil passage 36, and the valve being connected to the intake of the pump by a bypass conduit 38. The strainer leads into an oil distributing chamber 40 to which the valve is connected by the passage 36 and to which the lubrication system of the engine is connected by a suitable passage 42.

From this description it will be observed that when the pressure in the chamber 40 is above a predetermined value for which the pressure relief valve 32 is set, the oil will flow from this chamber through the passage 36, the valve 32, and by-pass 38, back to the intake of the pump, in which case the oil is simply recirculated and is not fed to the engine, the supply of oil to the engine being definitely determined by the constant pressure of the oil in the chamber 40.

The conduit 42 leading from the distribution chamber 40 communicates through suitable passages 44 with the various accessory drives of the engine and leads into a main oil channel 46, one end of which communicates with the interior of the hollow crankshaft 16 through suitable oil collector rings 48 and the other end of which is carried around to the forward portion of the engine where it communicates with the lubrication passages of the forward valve operating mechanisms, one of the smaller oil passages at the front end of the engine being indicated at 50. From the conduit 46 a branch conduit 52 may be provided to supply oil to the hydraulic operating mechanism of a suitable controllable pitch propeller, not illustrated, the oil from this branch conduit being led into the hollow propeller shaft through suitable oil collector rings 54. The main supply of lubricating oil to the various working parts of the engine is through the hollow crankshaft 16, but certain engine accessories and small working parts such as the valves may be supplied with oil through conduits independent of the crankshaft. It will be noted, however, that in some engines, the valve tappets are supplied with oil led out of the front end of the crankshaft, and various other lubricating features may be resorted to which in no way affect the scope of the present invention. For example, it is quite common to connect the oil supply to the front end instead of the rear end of the crankshaft, but the present invention may obviously be applied to any type of engine pressure lubricating system without in any way affecting the scope of the invention.

As explained above the valve 32 is adjusted to maintain the oil in the engine lubricating system constant at a predetermined pressure. When the oil is cold and viscous, however, it has been found that an oil pressure suitable for proper lubrication when the oil is in a freely flowing state is not sufficient to force the viscous oil through the many restricted passages and apertures provided in the lubricating system, so that until the oil warms up many of the working parts of the engine are forced to run with inadequate lubrication. The oil, even though cold and viscous is still fluid, however, and may be forced to all of the working parts of the engine in adequate quantity if a sufficiently high pressure is imposed on the oil in the lubricating system. The present invention, therefore, contemplates the provision of means for regulating the pressure on the oil in proportion to the viscosity of the oil so that an adequate supply of oil will be maintained at all times and the pressure will be maintained constant at the proper value when the oil reaches a freely flowing condition.

In order to accomplish the above purpose, the valve 32 is provided with a check which prevents it from opening until the oil in the engine at points remote from the pump has reached a sufficient pressure to afford adequate lubrication. This valve check is operated by the pressure of oil flowing through an auxiliary oil line 56 which is connected at one end with the valve and at the other end with a point in the engine lubrication system as indicated at 58 remote from the pump 28 or at which the oil pressure builds up only as all of the working parts are supplied with adequate lubrication. As the ordinary engine of the type referred to above has the oil pump mounted at the rear of the engine, and connected with the accessory drive mounted upon the rear of the engine, it is consistent with the objects of this invention to connect the auxiliary oil conduit 56 with some part of the oil conduit system at the front part of the engine, such for instance, as the small conduit 50 which supplies oil to one of the valve operating tappets 60.

In some engines it has been found that the same result can be obtained by connecting the valve check with some selected point in the engine lubrication system which may be nearer the pump, since because of the restricted passages in certain parts of the lubricating system, the oil will not reach such a point near the pump before oil has reached the point in the lubrication system most remote from the pump. Such an alternative connection is indicated at 62 which is shown in the present illustration as closed by the plug 64.

It is also within the scope of the invention to control the pressure relief valve in accordance with the pressures at a plurality of points in the lubrication or other fluid pressure system more or less remote from the source of fluid pressure. For instance, in the illustrative form of the invention shown in the drawings, the plug 64 could be removed and the pressure relief valve controlled by both the lines 56 and 62. Where a plurality of selected points in the system are connected with the valve, the pressures existing at the various points will be balanced or averaged in their effect on the valve by reason of the fact that a higher pressure in one line may cause fluid to feed back through a line carrying a lower pressure until the pressures are all substantially equalized. Meanwhile, the valve will be responsive to the average or combined pressure to control the pressure of the fluid entering the system.

The action of the valve check under the above described circumstances is to prevent the valve 32 from opening and bypassing any of the oil before the pressure at the selected point from which the valve is to be controlled has reached a preselected value. As the pump is designed to have an output greater than that necessary to supply the lubrication requirements of the engine, it is obvious that under these conditions the pump will build up a high pressure which will be entirely sufficient to force the oil to all portions of the engine requiring lubrication even though various factors, such as viscosity of the oil, restrictions, or leaks in the system, tend to retard or diminish the flow of oil to remote parts of the system.

A suitable valve construction for accomplishing the above described function is particularly illustrated in Fig. 2. In this construction the valve is provided at one end with a tubular externally threaded boss 66 which is screw threaded into the end of the channel 36. This boss carries a coaxial sleeve portion 68 provided with ports 70 which communicate with the bypass channel 38. A main cylindrical valve casing 72 is provided with external screw threads at each end thereof, and is threaded at one end into the portion of the engine crankcase 10 in which the channel 36 is provided so that the end of the casing receives a portion of the sleeve member 68 in spaced concentric relation therewith. Intermediate its length the valve casing 72 is provided with a transverse partition 74 having a central aperture from which an elongated cylindrical boss 76 extends into the sleeve portion 68 of the member 66. A cup-shaped closure member 78 is disposed within the sleeve portion 68 surrounding the boss 76 and is provided with a beveled face 80 which cooperates with a beveled seat 82 provided interiorly of the member 66 to form an oil tight closure for the passage 36 when the valve closure member 78 is seated on the valve seat 82. The valve member 78 is urged to its closed position by a plunger 84 which extends through the elongated tubular boss 76 and bears at its end against the interior of the bottom of the cup-shaped valve member 78. This plunger 84 is provided at its end remote from the valve member 78 with a cup-shaped piston 86 within which is disposed a stiff coiled compression spring 88 which bears at one end against the bottom of the cup-shaped piston and at the other end against an adjustable abutment 90. The piston 86 has a close or lapped fit with the interior of the cylindrical casing member 72 to provide an oil seal between the piston and the casing member. Adjacent to the partition 74 on the side thereof remote from the valve member 78, the valve casing 72 is provided with a plurality of radially spaced ports 92 surrounded by a ring 94 which has an interior annular groove 96 communicating with the ports. The auxiliary oil line 56 is led through the ring 94 into communication with the groove 96 to supply oil to the interior of the casing 72 through the ports 92. The ring 94 be built up in the chamber between the piston 86 and the partition 74, which pressure acts against the spring 88. When the oil has reached its normal operating temperature, a pressure of 100 lbs. will have been established behind the piston 86, which pressure will reduce the force of the spring 88 to such a value as to maintain a pressure of 100 lbs. in the lubricating system of the engine.

From this description it will be observed that the improved oil pressure relief valve is effective to maintain the desired oil pressure in the lubrication system of the engine when the engine is operating under normal conditions, and is also effective to increase the pressure on the lubricating oil to provide adequate engine lubrication when the oil is too viscuous to flow to all of the parts of the lubrication system under normal operating pressure.

cess of the pressure requirements of said system, a bypass for said pump, a pressure relief valve for controlling said bypass, and means operatively connecting said valve with a selected point in said system to render said valve responsive to the pressure at said selected point to maintain the fluid pressure at said selected point in said system constant at a preselected value.

6. In a fluid pressure system having a pump for supplying fluid under pressure to all parts of said system, said pump having a capacity in excess of the pressure requirements of said system, a bypass for said pump, a pressure relief valve for controlling said bypass, said valve being set to maintain the pressure at the inlet to said system at a value sufficient to force the fluid when in a highly viscous state to all parts of said system, and means connecting said valve with a selected point in said system to cause the pressure of the fluid at said point to act against said valve to reduce the pressure maintained by said valve to a selected operating pressure when the pressure of the fluid at the selected point reaches the value of said selected operating pressure for said point.

7. In a pressure lubrication system for an internal combustion engine, a pump for supplying oil under pressure to all parts of said system, the capacity of said pump being in excess of the lubrication requirements of said engine, a bypass for said pump, a pressure relief valve for controlling said bypass to maintain a selected fluid pressure in said system, said valve being spring urged to its closed position, a piston in said valve, and means for bringing the fluid pressure at a selected point in said lubrication system to act on said piston to reduce the effect of said spring acting to close said valve.

8. In a pressure lubrication system for an internal combustion engine, a pump for supplying oil under pressure to all parts of said system, the capacity of said pump being in excess of the lubrication requirements of said engine, a bypass for said pump, a pressure relief valve for controlling said bypass to maintain a selected fluid pressure in said system, said valve having a closure member spring urged toward its closed position and urged toward its open position by fluid pressure acting against the face of said closure member, a piston in said valve, and means for applying the pressure of the lubricant at a selected point in said system to said piston to reduce the force exerted by said spring on said closure member.

9. In a pressure lubrication system for an internal combustion engine, a pump for supplying oil under pressure to all parts of said system, the capacity of said pump being in excess of the lubrication requirements of said engine, a bypass for said pump, a pressure relief valve for controlling said bypass to maintain a selected fluid pressure in said system, said valve having a closure member spring urged toward its closed position and urged toward its open position by fluid pressure acting against the face of said closure member, a piston in said valve, and means for applying the pressure of the lubricant at a selected point in said system to said piston to reduce the force exerted by said spring on said closure member, the strength of said spring and the area of the face of said closure member and the area of said piston being so proportioned that a preselected high pressure will be applied to said system when there is no pressure on said piston and a preselected operating pressure is maintained in said system when said operating pressure is exerted on said piston.

10. In a pressure lubrication system for an internal combustion engine, a pump for supplying oil under pressure to all parts of said system, the capacity of said pump being in excess of the lubrication requirements of said engine, a bypass for said pump, a pressure relief valve for controlling said bypass to maintain a selected fluid pressure in said system, said valve having a closure member spring urged toward its closed position and urged toward its open position by fluid pressure acting against the face of said closure member, a piston in said valve, and means for applying the pressure of the lubricant at a selected point in said system to said piston to reduce the force exerted by said spring on said closure member, and means for adjusting said spring.

11. A pressure relief valve comprising, a closure member arranged to be urged toward valve opening position by fluid pressure, an adjustable spring for urging said closure member toward valve closing position, and a piston operatively associated with said spring and responsive to fluid pressure to reduce the force exerted on said closure member by said spring.

12. In a fluid pressure system to which an excess of fluid is supplied, a pressure relief valve actuated by the pressure of the fluid at a selected point in said system for limiting the pressure in said system and means associated with said relief valve and actuated by the pressure at another point in said system for modifying the action of said relief valve.

13. In combination, a conduit to which an excess of fluid is supplied, a pressure relief valve actuated by the pressure at a selected point in said conduit to limit said pressure to a predetermined value, and means associated with said valve for causing said valve to limit the pressure in said conduit to a different predetermined value, said last named means constructed and arranged to be actuated in response to changes in a physical property of said fluid at a different point in said conduit.

14. In a pressure relief valve having an inlet and an outlet a closure member for said inlet arranged to be opened by fluid pressure in said inlet, resilient means for urging said closure member to close said inlet, another inlet in said valve and means actuated by fluid introduced through said other inlet to reduce the force exerted by said spring on said closure member.

15. A pressure relief valve comprising, a closure member arranged to be opened by the application of fluid pressure thereto, a spring for urging said closure member to closed position, and fluid pressure responsive means hydraulically separated from said closure member for modifying the valve closing action of said spring.

16. A pressure relief valve comprising, a casing having two separated chambers therein, an inlet and an outlet in one of said chambers, a closure member in said one chamber for obstructing fluid flow from said inlet to said outlet, a spring in the other of said chambers for resiliently urging said closure member to valve closing position, and a fluid pressure responsive means in said other chamber operative upon an increase in the fluid pressure applied thereto, to reduce the force exerted by said spring on said closure member.

LEONARD S. HOBBS.